United States Patent [19]

Schoening et al.

[11] Patent Number: 4,643,872
[45] Date of Patent: Feb. 17, 1987

[54] PROCESS FOR THE CONSTRUCTION OF A NUCLEAR REACTOR WITH A REINFORCED CONCRETE PRESSURE VESSEL

[75] Inventors: Josef Schoening, Hambruecken; Hans-Georg Schwiers, Ketsch, both of Fed. Rep. of Germany

[73] Assignee: Hochtemperatur-Reaktorbau GmbH, Fed. Rep. of Germany

[21] Appl. No.: 591,569

[22] Filed: Mar. 20, 1984

Related U.S. Application Data

[63] Continuation of Ser. No. 235,508, Feb. 18, 1981, abandoned.

[30] Foreign Application Priority Data

Mar. 28, 1980 [DE] Fed. Rep. of Germany ....... 3012101

[51] Int. Cl.⁴ .............................................. G21C 9/00
[52] U.S. Cl. .................................... 376/296; 376/381; 264/35
[58] Field of Search ................... 52/245, 741; 264/31, 264/32, 34, 35, 228; 376/295, 296, 381

[56] References Cited

U.S. PATENT DOCUMENTS

| | | |
|---|---|---|
| 3,151,416 | 10/1964 | Eakin et al. |
| 3,390,211 | 6/1968 | Ziegler |
| 3,537,420 | 11/1970 | Chollet et al. ...................... 376/295 |
| 4,068,419 | 1/1978 | Decoppet ............................ 52/741 |
| 4,221,262 | 9/1980 | Baumgaertner et al. |

*Primary Examiner*—Deborah L. Kyle
*Assistant Examiner*—Richard W. Wendtland
*Attorney, Agent, or Firm*—Robert J. Koch

[57] ABSTRACT

Process for the construction of a nuclear reactor having a reinforced concrete pressure vessel, comprising utilization of a corset frame to support the cavity liner, closing off the reactor cavity and installing the reactor components under "clean conditions", simultaneous to the layer-by-layer pouring of the walls and top of the reinforced concrete pressure vessel. The erection of the supporting corset substantially reduces the overall assembly time of the nuclear power station without involving additional expense.

9 Claims, 2 Drawing Figures

PROCESS FOR THE CONSTRUCTION OF A NUCLEAR REACTOR WITH A REINFORCED CONCRETE PRESSURE VESSEL

This is a continuation, of application Ser. No. 235,508, filed Feb. 18, 1981 now abandoned.

BACKGROUND OF THE INVENTION

1. Field of the Invention

The invention concerns a process for the construction of a nuclear reactor having a reinforced concrete pressure vessel with at least a center cavity in the concrete vessel to receive the reactor installations and a liner fitted against the internal surface of the concrete forming the center cavity and the reactor so constructed.

2. Background of the Prior Art

In the course of the construction of a nuclear reactor, the reinforced concrete pressure vessel very significantly determines the overall construction time of the nuclear reactor. Conventionally, the concrete of the reinforced concrete pressure vessel is poured in layers. It is also conventional to line the inner wall of the reinforced concrete pressure vessel. A nuclear reactor of this type is disclosed in U.S. Pat. No. 4,221,262, the disclosure of which is incorporated herein.

The installation of the reactor, especially of the core components and the components of the primary cooling medium circuit may be effected under "clean conditions" only. That is, installation of components is performed only when the internal space of the reinforced concrete pressure vessel is shielded and air-conditioned with respect to the outside environment in order to avoid contaminations of the internal areas of the reactor.

In order to satisfy these conditions, heretofore the reinforced concrete pressure vessel was poured and the liner was fixedly anchored in the wall of the reinforced concrete pressure vessel. Following the completion of pouring and lining to form the cavity and thus an internal space that could be shielded toward the outside, the internal area of the reinforced concrete pressure vessel could be accessible for the installation of the reactor components. In view of the numerous concrete sections of the vessel, this resulted in the fact that only after a substantial assembly period was there available an internal cavity made dust-free and air-conditioned, wherein the complicated and expensive installation of the reactor components could be initiated.

SUMMARY OF THE INVENTION

It is an object of the invention to provide a process for the construction of a nuclear reactor having a reinforced concrete pressure vessel of the above-mentioned type, wherein the overall construction time of the power station is significantly reduced.

The object is attained according to the invention by a process comprising construction of the bottom part of the vessel together with its liner, erecting a supporting corset frame for holding and the anchoring of the annular wall of the liner and encompassing a partial area of the wall of the concrete vessel, placing a cover upon the supporting corset frame to close off the cavity, and simultaneously mounting the reactor core components while continuing the pouring of the concrete vessel wall.

This process results in the advantageous achievement that the annular wall of the liner has a supporting structure surrounding the annular wall of the liner in the form of a supporting corset. In this manner the necessary stability and shape retention of the liner is obtained at an earlier stage in the construction process. Furthermore, by means of the covering of the inner space of the vessel, the inner space is sealed off to the outside and the "clean conditions" desired may be provided at an early date. It follows that the core components may be installed significantly earlier in the inner area of the reinforced concrete vessel so that overall the construction time of the nuclear reactor is shortened. Two segments of the construction work may be effected in an approximately simultaneous manner, i.e. the mounting of the reactor installations and the stratified pouring of the reinforced concrete pressure vessel are effected almost at the same time.

The supporting corset frame is preferably constructed so that it extends over the entire height of the liner. Its construction, in the most preferred embodiment, is by pouring the concrete material of the corset frame in a conventional manner, and only in the form of a frame.

In a preferred embodiment, a specific wall thickness of the supporting corset frame is called for. In order to be able to support all of the load bearing forces of the frames, covers and sheathings, a wall thickness of the supporting corset frame of 1/6 to 1/15, preferably ⅛ to 1/12 of the vertical reinforced concrete pressure vessel wall, has been found to be favorable.

In a further embodiment of the invention, the supporting corset frame has openings for the introduction of component parts for the purpose of assembly. Following the completion of the reactor core components, the passages may be inserted in the openings. The openings provided for installation purposes are equipped with locks so that the inner area of the vessel may be maintained under "clean conditions".

Following the completion of the final concrete work on the wall of the reinforced concrete pressure vessel in one embodiment of the invention and following the installation of the core components in the internal space of the reinforced concrete pressure vessel, the access and recess openings are sealed with armored tubes as the passages. The covering is then taken from the reinforced concrete pressure vessel and the liner top is inserted. After this, the stratified pouring of the concrete of the inside of the cover is initiated. The supporting corset frame provides stress relief during the layer-by-layer pouring of the reinforced concrete vessel walls and top.

BRIEF DESCRIPTION OF THE DRAWINGS

Further advantages and characteristics of the invention will be found in the description to follow hereinbelow, with the aid of the drawings.

In the drawings

DETAILED DESCRIPTION OF THE EMBODIMENTS

Figure 1:
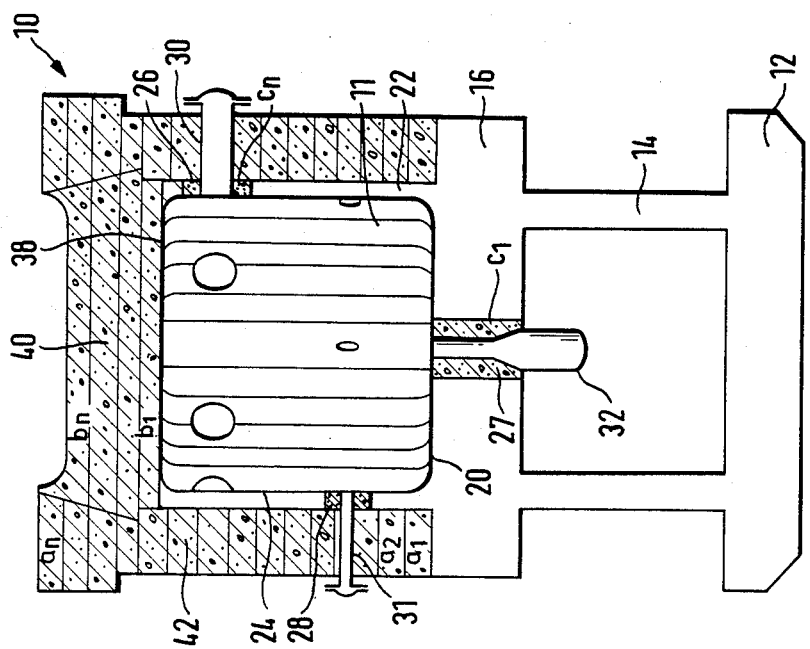
FIG. 1 shows the partially constructed reinforced concrete pressure vessel of the nuclear reactor with the supporting corset frame prior to the completion of the annular wall of the reinforced concrete pressure vessel.

FIG. 1 shows reinforced concrete pressure vessel 10 in an intermediate state of assembly. The foundation 12 with the annular support wall 14 and the bottom part 16 are erected first. Between the bottom part 16 and the annular supporting wall 14, bearings 18 are placed. Following the completion of the bottom part 16 of the reinforced concrete pressure vessel 10, the internal liner bottom 20 is installed. The supporting corset frame 22 is poured around the liner 24, whereby the liner 24 serves as the inner sheathing and is joined by means of its anchors with the corset frame 22 in a stable and shape-retaining manner. In the supporting corset 22, there are openings 26, 28 wherein passage conduits 31, 32 are inserted in the course of the completion of the wall 42 of the vessel. This wall 42 is shown in FIG. 1 by a dash-and-dot line.

After the completion of the liner 24 with the supporting corset 22, the inner area or cavity 11 is closed off by means of a cover 34 shown in FIG. 1 as resting on the supporting corset 22. The construction of this stage establishes a reactor installation capable of "clean conditions" in cooperation with the lock-like inlets in front of the openings 26, 27, 28 and 39. The opening 39 is located in the central area of the cover 34. The core components, not shown in detail, may thereafter be installed simultaneously with the remaining construction of the vessel itself. The cover 34 and the lock-like inlets thus affords dust-free and air-conditioned ventilation even prior to the erection of the wall 42 of the vessel. After "clean conditions" have been attained at an early date, the remaining work may be performed in a parallel manner, that is, the layer-by-layer pouring of the entire wall 42 of the reinforced concrete pressure vessel and can occur simultaneous to the installation of the core components.

The supporting corset frame 22 further serves to reduce the load on the construction equipment such as the scaffoldings, sheathings and cranes 36 required for the installation and transport work on the reinforced concrete pressure vessel 10.

Figure 2:
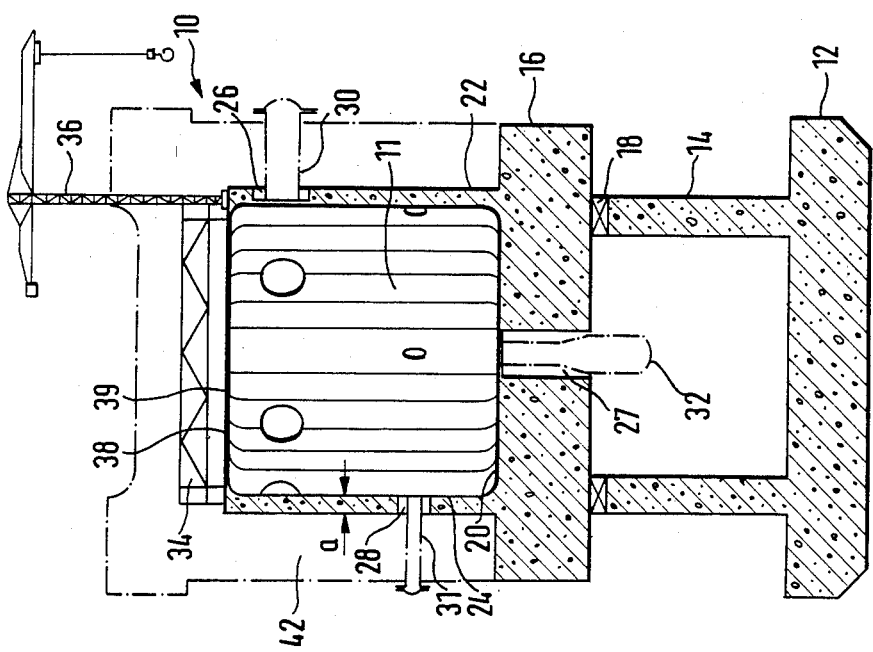
FIG. 2 depicts the finished reinforced concrete pressure vessel.

FIG. 2 shows the completed reinforced concrete pressure vessel emphasizing its individual construction segments. Around the supporting corset 22, the individual, successive concrete section of the cylindrical area $a_1$ to $a_n$ are built up in a timely succession. The openings 26, 27 and 28 have dimensions so that the passages 30, 31 and 32 are readily inserted, i.e. they are larger than the outer diameters of the passages 30, 31 and 32. In the course of the construction ($a_1$ to $a_n$) of the wall 42 of the reinforced concrete pressure vessel, after the insertion of the passages 30 and 31 in the openings 26, 28 the free space between the passages 30, 31 and the supporting corset 22 is filled with concrete through the pouring of the sections $c_n$ and $c_2$. Potentially existing cutouts in the liner are sealed by means of the insertion of elements and/or by welding of appropriate parts. The procedure is repeated at the opening 27 by the pouring of the section $c_1$. Hereafter, the cover 34 is removed and the liner cover 38 is welded in whereby the support of the liner cover 38 and the transfer of the load of the internal circular disk of the liner area 40 of the concrete cover by means of scaffolding to the supporting corset 22 and the wall 42 of the reinforced concrete pressure vessel is continued until a sufficient number of concrete sections ($b_1$ to $b_n$) have been poured and hardened so that the inner area 40 of the concrete cover is self-supporting. Following the completion of this work, the remaining concrete sections $b_1$ to $b_n$ may be poured and the scaffolding in the internal space 11 of the vessel removed.

In a preferred embodiment the entire primary circuit of the high temperature reactor is integrated in the internal space 11 of the reinforced concrete pressure vessel. In other words, the reinforced concrete pressure vessel 10 comprises the reactor core with the fuel elements, the heat exchanger components and the control rods. The prestressed concrete structure assumes the bearing of the load of the components and the stress of the internal pressure. Simultaneously, it shields the radiation to the outside. The wall 42 of the vessel is shown with the sections $a_1$ to $a_n$ by a broken line.

The above description describes a preferred embodiment of the invention. It is to be understood however, that the invention is not limited to any single embodiment or feature, but should be construed to cover all modifications and alternative embodiments falling within the scope of the invention as defined by the claims which follow.

What is claimed is:

1. A process for constructing a gas cooled, high temperature nuclear reactor having a reinforced concrete pressure vessel with concrete walls comprising the steps of:
   constructing the bottom part of the vessel;
   erecting a corset frame for the vessel walls;
   anchoring to said corset frame a vessel cavity wall liner forming a vessel cavity;
   sealing the vessel cavity, maintaining the vessel cavity under clean conditions;
   pouring the concrete walls of the reinforced concrete vessel; and
   mounting reactor components in said sealed vessel cavity;
   wherein said steps of pouring and mounting are performed simultaneously.

2. The process of claim 1 wherein said vessel cavity is sealed by placing a cover over said cavity formed by said wall liner.

3. The process of claim 1 wherein said supporting corset extends over the entire height of said wall liner.

4. The process of claim 1 wherein the wall thickness of said supporting corset is from about 1/6 to 1/15 of the vertical wall of the reinforced concrete pressure vessel and wherein said supporting corset assumes the load of construction scaffolding, covers and sheathings.

5. The process of claim 1 wherein the wall thickness of said supporting corset is from about ⅛ to 1/12 of the vertical wall of the reinforced concrete pressure vessel and wherein said supporting corset assumes the load of construction scaffolding, covers and sheathings.

6. The process of claim 1 wherein said supporting corset is provided with openings for the introduction of reactor component parts for their installation and wherein passage conduits are inserted in said openings after the installation of the reactor core components.

7. The process of claim 6 wherein said openings are equipped with locks for assembly purposes and capable of maintaining the internal space of the vessel under "clean conditions".

8. The process of claim 2 wherein said cover is removed after the sealing of openings in said supporting corset and a liner top is inserted to seal said cavity followed by the pouring of the inner area of the cover with concrete layers.

9. The process of claim 1 wherein a bottom liner is anchored to said bottom part prior to the erection of said corset frame.

* * * * *